United States Patent
Kawabata et al.

(10) Patent No.: US 6,927,191 B2
(45) Date of Patent: Aug. 9, 2005

(54) OXIDATION CATALYST

(75) Inventors: Hisaya Kawabata, Hiroshima (JP);
Masahiko Shigetsu, Hiroshima (JP);
Kazuo Misonoo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 281 days.

(21) Appl. No.: 10/211,431

(22) Filed: Aug. 2, 2002

(65) Prior Publication Data

US 2003/0027719 A1 Feb. 6, 2003

(30) Foreign Application Priority Data

Aug. 3, 2001 (JP) .......................... 2001-235915

(51) Int. Cl.[7] .................. B01J 29/06; B01J 21/00; B01J 23/58; B01J 23/00

(52) U.S. Cl. .................. 502/330; 502/66; 502/74; 502/327; 502/332; 502/333; 502/339; 502/347; 502/348; 502/355; 502/415; 502/439; 502/527.12; 502/527.13

(58) Field of Search .................. 502/327, 330, 502/332, 333, 339, 344, 347, 348, 355, 415, 439, 527.12, 527.13, 66, 74

(56) References Cited

U.S. PATENT DOCUMENTS

| | | | | |
|---|---|---|---|---|
| 3,666,813 A | * | 5/1972 | Hindin et al. | 564/417 |
| 3,962,285 A | * | 6/1976 | Cusumano | 549/536 |
| 3,969,274 A | * | 7/1976 | Frampton | 502/213 |
| 4,005,049 A | * | 1/1977 | Fields | 502/330 |
| 4,548,921 A | * | 10/1985 | Geus et al. | 502/330 |
| 5,821,392 A | * | 10/1998 | Aoyama et al. | 570/176 |
| 6,037,307 A | * | 3/2000 | Campbell et al. | 502/325 |
| 6,127,310 A | * | 10/2000 | Brown et al. | 502/339 |
| 6,627,578 B2 | * | 9/2003 | Xu et al. | 502/331 |

FOREIGN PATENT DOCUMENTS

JP      07256114 A      3/1994

* cited by examiner

Primary Examiner—Cam N. Nguyen
(74) Attorney, Agent, or Firm—Brooks Kushman P.C.

(57) ABSTRACT

An inside layer including zeolite and an outside layer including alumina and Pd are formed in a layered shape on a carrier, and Ag and Bi are simultaneously allowed to be carried on the inside and outside layers through impregnation. Thus, production of an alloy through a reaction between Pd and Ag can be suppressed by Bi.

5 Claims, 13 Drawing Sheets

Pd catalyst layer    HC adsorbent layer

Pd catalyst layer    HC adsorbent layer

Pd catalyst layer    HC adsorbent layer

Pd catalyst layer    HC adsorbent layer

OXIDATION CATALYST

BACKGROUND OF THE INVENTION

The present invention relates to a catalyst, an exhaust gas purifying catalyst, a method for purifying exhaust gas and a method for preparing a catalyst.

Gas exhausted from an engine of a car or the like includes HC (hydrocarbon), CO and NOx (nitrogen oxides). A known catalyst for purifying the exhaust gas is a ternary catalyst for simultaneously oxidizing HC and CO and reducing NOx. Also, it has been proposed to dispose a HC adsorbent of zeolite in an exhaust passage in the upstream side of the ternary catalyst, so as to adsorb HC included in the exhaust gas when the ternary catalyst has low activity such as immediately after start-up of the engine. Such a HC adsorbent, however, tends to start discharging HC before the ternary catalyst becomes active, and in this case, even though the HC included in the exhaust gas is adsorbed, the HC is discharged to the air without purification.

As a countermeasure, Japanese Laid-Open Patent Publication No. 7-256114 discloses that the adsorbing performance of a HC adsorbent (zeolite) is improved when Ag is carried on the HC adsorbent and that the heat resistance of the Ag can be improved when Bi is further carried on the HC adsorbent.

Furthermore, this publication describes that a HC adsorbent layer in which Ag and Bi are carried on a HC adsorbent and a ternary catalyst layer in which a noble metal selected from Pt, Pd and Rh is carried on alumina and ceria are supported on a honeycomb carrier with the HC adsorbent layer disposed inside. Thus, HC discharged from the inside HC adsorbent layer can be oxidized by the outside ternary catalyst layer.

This catalyst is prepared as follows: A powder in which Ag and Bi are carried on zeolite is supported on the honeycomb carrier by a wash coat method, so as to form the HC adsorbent layer. Then, a powder in which Pt is carried on ceria is supported on the HC adsorbent layer by the wash coat method, so as to form a Pt catalyst layer. Thereafter, a powder in which Rh is carried on alumina is supported on the Pt catalyst layer by the wash coat method, so as to form a Rh catalyst layer. According to the publication, Pt may be replaced with Pd.

In the catalyst including Ag and Pd, however, although Pd naturally has high activity as an oxidation catalyst at a low temperature, the temperature at which its activity starts to be exhibited is disadvantageously increased due to the presence of Ag. According to the study of the present inventor, this is because Pd and Ag are reacted to each other to produce a Pd—Ag alloy, which increases the activation temperature. Also, even when Bi is disposed in the vicinity of Ag by allowing zeolite to carry both Ag and Bi, the degradation of the low temperature activity of Pd cannot be avoided.

SUMMARY OF THE INVENTION

An object of the invention is overcoming this problem that the activation temperature of Pd is increased by the presence of Ag.

Another object of the invention is overcoming a problem that the activation temperature of Pd serving as an oxidation catalyst is increased by the presence of Ag in a catalyst system in which a HC adsorbent layer including a HC adsorbent and Ag and an oxidation catalyst layer including Pd for oxidizing HC discharged from the HC adsorbent layer are supported on a carrier with the HC adsorbent layer disposed inside.

Still another object of the invention is providing a method for preparing a catalyst capable of overcoming the problem of the degradation of the low temperature activity of Pd.

The present inventor has found through examination of the aforementioned problems that the reaction between Pd and Ag can be suppressed by effectively using Bi, resulting in completing the present invention.

The oxidation catalyst of this invention includes Pd and Ag, and Bi present as the nearest neighbor atom of the Pd.

Pd and Ag are adjacent to each other on the same row in the periodic table and hence can be easily alloyed. However, when a Bi atom is present as the nearest neighbor atom of Pd, Bi can prevent Ag and Pd from being easily alloyed. On the other hand, Bi never lowers the function of Pd as an oxidation catalyst differently from Ag. Accordingly, in the catalyst of this invention, Bi prevents production of an alloy of Pd and Ag, so as to advantageously secure the low temperature activity for working as an oxidation catalyst.

In the catalyst, the Pd and the Bi may be carried on alumina.

Preferably, the Bi and the Ag are simultaneously carried through impregnation on the alumina carrying the Pd and having been baked.

Thus, the Bi atom is carried on the alumina as the nearest neighbor atom of the Pd atom in the catalyst, and since the Bi atom is thus present as the nearest neighbor atom, the rates of Pd and Ag changed into an alloy can be lowered, so as to advantageously secure the low temperature activity of Pd. In other words, if the Ag is priorly carried on the alumina on which the Pd has been carried, the Ag is present as the nearest neighbor atom of the Pd. Therefore, even when the Bi is carried afterward, it is difficult to obtain the catalyst in which the Bi atom is present as the nearest neighbor atom of the Pd atom. However, when the Bi and the Ag are simultaneously carried through the impregnation, the desired catalyst can be obtained.

In the preparation of the catalyst, baking is performed at 200° C. or more.

The exhaust gas purifying catalyst of this invention for purifying exhaust gas from an engine, includes a carrier; a HC adsorbent layer including a HC adsorbent for adsorbing HC included in the exhaust gas and discharging adsorbed HC in accordance with increase of a temperature, and Ag; and an oxidation catalyst layer including Pd and Bi for oxidizing the HC discharged from the HC adsorbent, and the HC adsorbent layer and the oxidation catalyst layer are supported on the carrier with the HC adsorbent layer disposed inside and the oxidation catalyst layer disposed outside.

This exhaust gas purifying catalyst is advantageous in improving the HC adsorbing performance of the HC adsorbent, in particular, in increasing the HC discharging temperature, owing to the Ag, so that the HC discharged from the HC adsorbent layer can be effectively oxidized by the Pd included in the oxidation catalyst layer. Furthermore, since the Bi is included in the outside oxidation catalyst layer including the Pd, even when the Ag moves from the HC adsorbent layer to the oxidation catalyst layer, the Bi can prevent the Ag from reacting with the Pd to produce an alloy. As a result, the low temperature activity of Pd can be advantageously kept.

As the HC adsorbent, a variety of zeolites including β-type zeolite, Y-type zeolite and MFI can be used, and the β-type zeolite is preferably used for adsorbing HC included in exhaust gas from an engine.

The exhaust gas purifying catalyst preferably further includes, between the HC adsorbent layer and the oxidation catalyst layer, an intermediate layer including no Pd and allowing HC to move between the HC adsorbent layer and the oxidation catalyst layer.

The Ag included in the inside HC adsorbent layer is minimally allowed to move to the outside oxidation catalyst layer by the intermediate layer, so as to advantageously suppress the production of an alloy of Ag and Pd. This intermediate layer does not include Pd in order to prevent the Ag included in the HC adsorbent layer from moving to the intermediate layer to alloy with Pd included therein.

The intermediate layer is preferably made from an inorganic porous material such as alumina, and is more preferably formed as a ternary catalyst layer in which Pt or Pt and Rh are carried thereon. In order to attain a large range of the air fuel ratio for effectively functioning as the ternary catalyst, an oxygen occlusion agent such as ceria is preferably included. Since Pt and Rh are less reactive with Ag than Pd (namely, difficult to produce an alloy with Ag), such a ternary catalyst layer is effective in preventing the Ag included in the HC adsorbent layer from moving through the intermediate layer to the outside oxidation catalyst layer.

In the exhaust gas purifying catalyst, the HC adsorbent layer disposed inside and the oxidation catalyst layer disposed outside may be supported on the carrier by forming, on the carrier, an inside layer including the HC adsorbent and no Ag and an outside layer including Pd, baking the inside layer and the outside layer, and simultaneously allowing Ag and Bi to be carried on the inside layer and the outside layer through impregnation. In this case, the HC adsorbent may be zeolite.

Thus, the Bi atom can be easily present as the nearest neighbor atom of the Pd atom in the outside layer, and as a result, the rate of Ag alloyed with the Pd is smaller and the low temperature activity of Pd can be advantageously secured. Also, Ag can be carried on zeolite serving as the HC adsorbent in the HC adsorbent layer thus formed. Accordingly, the HC adsorbing performance of zeolite can be improved by the Ag, in particular, the HC discharging temperature can be increased, so that the HC discharged from the HC adsorbent layer can be efficiently oxidized by the Pd included in the oxidation catalyst layer.

Also, the method of this invention for removing HC from exhaust gas from a car engine in an exhaust passage where a temperature of the exhaust gas may be 800° C. or more, includes the steps of disposing a catalyst converter in the exhaust passage, the catalyst converter including a catalyst in which a HC adsorbent layer including a HC adsorbent and Ag and an oxidation catalyst layer including Pd and Bi for oxidizing HC discharged from the HC adsorbent are supported on a carrier with the HC adsorbent layer disposed inside and the oxidation catalyst layer disposed outside; adsorbing HC included in the exhaust gas by the HC adsorbent layer by allowing the exhaust gas to pass through the catalyst converter when the temperature the exhaust gas is 200° C. or less; and after the step of adsorbing HC, oxidizing the HC discharged from the HC adsorbent layer by the oxidation catalyst layer by allowing the exhaust gas to pass through the catalyst converter when the temperature the exhaust gas is 250° C. or more.

Accordingly, in the case of cold start-up of the engine, HC included in the exhaust gas can be adsorbed by the HC adsorbent of the HC adsorbent layer while the temperature of the exhaust gas is increasing from room temperature to approximately 200° C., and therefore, HC not purified can be prevented from being discharged to the air. Thereafter, when the temperature of the exhaust gas increases to 250° C. or more in accordance with warming of the engine, the HC having been adsorbed by the HC adsorbent starts to be discharged, and the discharged HC is purified through oxidation by the Pd included in the oxidation catalyst layer. Also, since the Bi is included in the oxidation catalyst layer, even when the temperature of the exhaust gas becomes high, the reaction between Pd and Ag included in the HC adsorbent layer can be prevented by the Bi, so as to keep the low temperature activity of the Pd.

Moreover, the method of this invention for preparing a catalyst in which Pd, Ag and Bi are carried on a supporting member, includes the steps of allowing the Pd to be carried on the supporting member; and allowing the Ag and the Bi to be carried on the supporting member without allowing the Ag to be carried priorly to the Bi.

Accordingly, the catalyst including Pd and Ag in which a Bi atom is present as the nearest neighbor atom of a Pd atom can be obtained. The Ag and Bi can be carried on the supporting member without allowing the Ag to be carried priorly to the Bi, and hence, the Ag and Bi can be simultaneously carried on the supporting member, or the Bi can be carried priorly to the Ag.

The catalyst according to the present invention can be used for purifying any of a variety of exhaust gases including HC, and is particularly suitably used for purifying exhaust gas from a car engine when provided in an exhaust passage of the engine.

DETAILED DESCRIPTION OF THE INVENTION

Now, preferred embodiments of the invention will be described with reference to the accompanying drawings.

Figure 1:
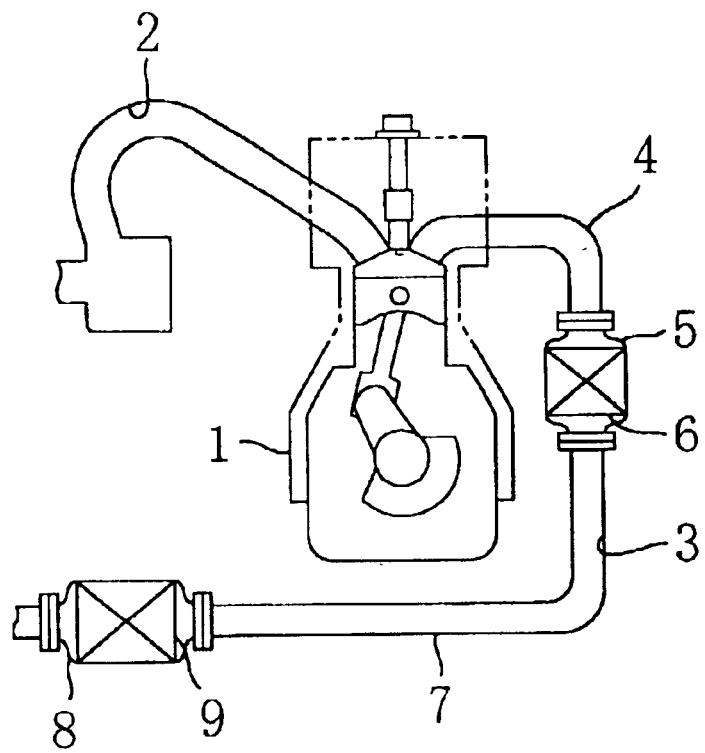
FIG. 1 is a diagram for showing arrangement of a catalyst according to the invention when used for purification of exhaust gas from a car engine.

In FIG. 1, a reference numeral 1 denotes a car gasoline engine, a reference numeral 2 denotes a suction passage of the engine and a reference numeral 3 denotes an exhaust passage of the engine. A catalyst vessel 5 is directly connected to a collecting part of an exhaust manifold 4 included in the exhaust passage 3, and the catalyst vessel 5 contains a ternary catalyst 6. Another catalyst vessel 8 is disposed midway an exhaust pipe 7 connected to the catalyst vessel 5, and the catalyst vessel 8 contains a HC adsorbing catalyst 9. In a HC adsorbing catalyst converter including the HC adsorbing catalyst 9 contained in the catalyst vessel 8, the temperature of the exhaust gas can be increased up to 800° C. or more depending upon the operation state of the engine 1 (for example, when the engine is operated at a high revolution speed with a high load).

In the case of the cold start-up of the engine, the HC adsorbing catalyst 9 adsorbs HC included in the exhaust gas until the temperature of the exhaust gas is increased from room temperature to approximately 200° C. Thereafter, when the temperature of the exhaust gas becomes 250° C. or more as a result of warming of the engine, the HC adsorbing catalyst 9 discharges the adsorbed HC and purifies the discharged HC through oxidation with a catalyst metal such as a noble metal.

<Structure of HC adsorbing catalyst 9>

Figure 2:
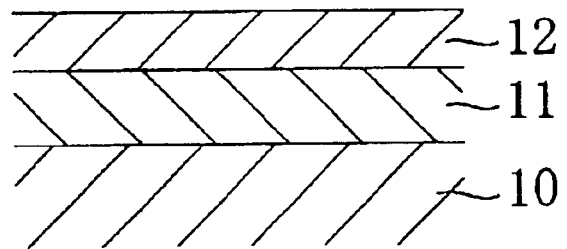
FIG. 2 is a cross-sectional view for showing an exemplified structure of the catalyst of the invention.

FIG. 2 shows a catalyst layer structure of the HC adsorbing catalyst 9. A reference numeral 10 denotes a part of a honeycomb carrier, on which a HC adsorbent layer 11 and a Pd catalyst layer 12 are supported in a layered shape with the former disposed inside and the latter disposed outside.

The HC adsorbent layer 11 includes β-type zeolite serving as a HC adsorbent and Ag carried on the β-type zeolite. The β-type zeolite preferably has a $SiO_2/A_2O_3$ ratio of 120 or more. The supported amount (namely, the amount included per 1 L of the carrier; which also applies to all supported amounts mentioned below) of the β-type zeolite is, for example, approximately 100 through 200 g/L. The supported amount of the Ag is approximately 7 through 30 g/L.

The Pd catalyst layer 12 includes a catalyst in which Pd is carried on active alumina serving as a supporting member and a Ce—Pr double oxide (namely, a double oxide including a Ce ion and a Pr ion); and Bi. The Bi atom is present as the nearest neighbor atom of the Pd atom. The supported amount of the active alumina is, for example, approximately 50 through 100 g/L. The Ce—Pr double oxide works as an oxygen occlusion agent, and the supported amount of the Ce—Pr double oxide is approximately ⅓ of that of the active alumina. The supported amount of the Pd is approximately 2 through 8 g/L. The supported amount of the Bi is approximately 0.25 through 1.0 g/L. The oxygen occlusion agent is not limited to the double oxide but may be any oxide including a Ce ion.

The layers 11 and 12 respectively include binders. The binder used in the HC adsorbent layer 11 is hydrated alumina, and the binder used in the Pd catalyst layer 12 is zirconia. The supported amount of each binder is approximately 10 through 30 mass % of that of the supporting member.

Figure 3:
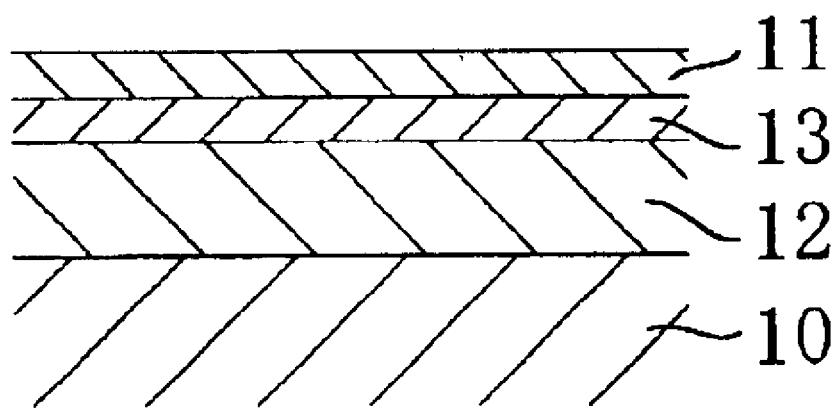
FIG. 3 is a cross-sectional view for showing another exemplified structure of the catalyst of the invention.

FIG. 3 shows another catalyst layer structure of the HC adsorbing catalyst 9. This structure is different from that shown in FIG. 2 in including a ternary catalyst layer (intermediate layer) 13 between the HC adsorbent layer 11 and the Pd catalyst layer 12. The ternary catalyst layer 13 includes a catalyst in which Pt is carried on active alumina serving as the supporting member; and a catalyst in which Rh is carried on a Ce—Nb—Zr double oxide (namely, a double oxide including a Ce ion, a Nd ion and a Zr ion) serving as an oxygen occlusion agent.

The supported amount of the active alumina in the Pd catalyst layer 12 is, for example, 20 through 50 g/L, and the supported amount of the Ce—Pr double oxide is approximately ⅓ of that of the active alumina. The supported amount of the Pd is approximately 1 through 4 g/L, and the supported amount of the Bi is approximately 0.25 through 1.0 g/L.

The supported amount of the active alumina in the ternary catalyst layer 13 is, for example, 20 through 50 g/L, and the supported amount of the Ce—Nb—Zr double oxide is approximately ⅓ of that of the active alumina. The supported amount of the Pt is 0.05 through 0.2 g/L, and the supported amount of the Rh is approximately 0.1 through 0.3 g/L.

The HC adsorbent layer 11 is the same as that used in the structure of FIG. 2.

Now, specific embodiments will be described.

Embodiment 1

A catalyst with the two-layer structure shown in FIG. 2 is used in this embodiment. The carrier 10 used in this embodiment is a honeycomb carrier made from cordierite and having 400 cells in a cross-section of approximately 6.45 $cm^2$ (namely, 1 $inch^2$), a wall thickness between adjacent cells of approximately 0.15 mm (6 milli-inch) and a volume of 1.3 L.

The HC adsorbent layer 11 used in this embodiment is formed by impregnating, with a solution of Ag and Bi, a mixture layer of β-type zeolite and a hydrated alumina binder with a boehmite structure, so as to carry Ag and Bi. The supported amount of the β-type zeolite is 160 g/L, and the supported amount of the hydrated alumina binder is 20 mass % of that of the β-type zeolite. The β-type zeolite has a $SiO_2/Al_2O_3$ ratio of 300.

The Pd catalyst layer 12 used in this embodiment is formed by impregnating, with a solution of Ag and Bi, a mixture layer of a catalyst powder in which Pd is carried on a supporting member (that is, a mixture of active alumina (γ-alumina) and a Ce—Pr double oxide) and a zirconia binder, so as to carry Ag and Bi. The supported amount of the active alumina is 70 g/L, the supported amount of the Ce—Pr double oxide is 23 g/L, the supported amount of the zirconia binder is 16 g/L, and the supported amount of the Pd is 5.7 g/L. The used zirconia binder is zirconyl acetate, which may be replaced with zirconium hydroxide or zirconium acetate.

The total supported amount of the Ag in the both layers 11 and 12 is 10 g/L, and the total supported amount of the Bi is 0.5 g/L.

The HC adsorbing catalyst 9 is prepared as follows:

(Formation of insider layer, namely, HC adsorbent layer)

The β-type zeolite and the hydrated alumina binder are mixed in the aforementioned proportion of their supported amounts, and water and nitric acid are added to the obtained mixture. The resultant is mixed and stirred with a disperser to give a slurry. The amount of nitric acid added is 30 g per kilogram of the β-type zeolite.

At room temperature, the honeycomb carrier is immersed in the slurry, pulled up to remove excessive slurry with air blow and dried at 200° C. These procedures are repeated until the carrier is coated with a desired amount of slurry, and the resultant is baked at 500° C. for 2 hours.

(Formation of outside layer, namely, Pd catalyst layer)

The active alumina powder and the Ce—Pr double oxide powder are mixed in the aforementioned proportion of the supported amounts, and a solution of palladium nitride dissolved in an ion-exchanged water is added dropwise to the mixture. The resultant is dried and baked at 500° C., so as to give a Pd carrying catalyst powder.

The Pd carrying catalyst powder and the zirconia binder are mixed, water and nitric acid are added to the mixture, and the resultant is mixed and stirred with a disperser to give a slurry in the same manner as in the formation of the HC adsorbent layer. This slurry is coated over the HC adsorbent layer of the honeycomb carrier in the aforementioned manner, and the resultant is baked at 500° C. for 2 hours.

(Impregnation with Ag solution and Bi solution)

A Ag solution in which silver nitrate is dissolved in an ion-exchanged water and a Bi solution in which bismuth acetate is dissolved in an acetic acid aqueous solution are mixed. The coating layers (namely, both the inside layer and the outside layer) of the honeycomb carrier are impregnated with the obtained mixture. Thereafter, the resultant is dried at 200° C. for 2 hours and baked at 500° C. for 2 hours.

COMPARATIVE EXAMPLE

A catalyst of a comparative example is prepared in the same manner as in Embodiment 1 except that Bi is not included.

Evaluation Tests

The catalysts of Embodiment 1 and the comparative example are loaded on actual vehicles, so as to evaluate their HC adsorbing performances and HC purifying performances at fresh time (namely, when the catalysts are new), after bench aging for 24 hours at 800° C. and after bench aging for 24 hours at 900° C. (bench test). The HC adsorption rate and the HC purification rate thus obtained are shown in FIGS. 4 and 5, respectively.

Figure 4:
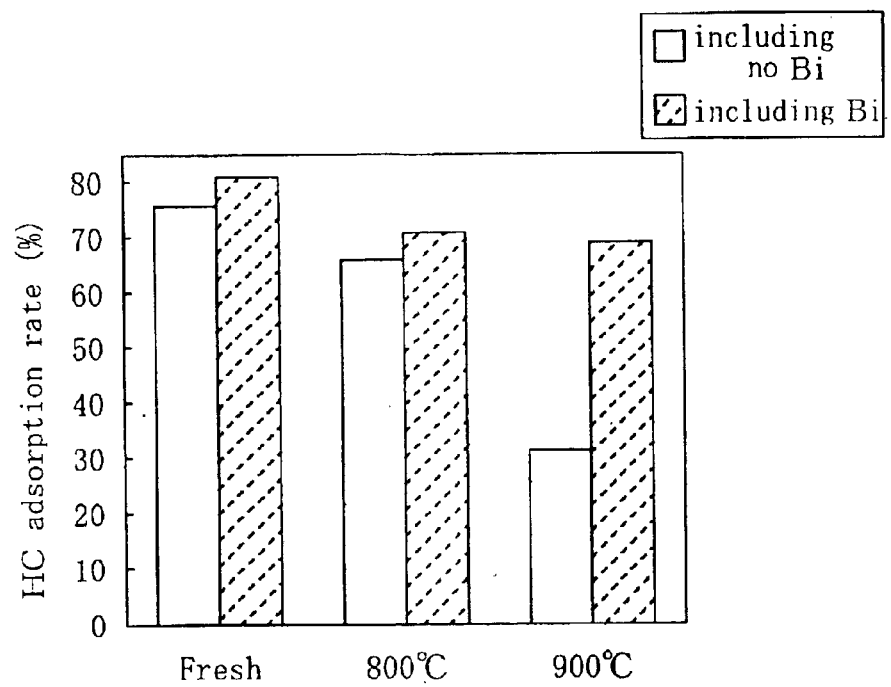
FIG. 4 is a graph for comparing catalysts of Embodiment 1 and a comparative example in HC adsorbing performance.

According to FIG. 4, the HC adsorption rate of the catalyst of Embodiment 1 including Bi is slightly higher than that of the comparative example including no Bi. This suggests a possibility that the amount of Ag, which effectively increases a HC discharging temperature of the HC adsorbent, is larger in Embodiment 1 than in the comparative example, namely, that a smaller amount of Ag has been changed into an alloy through the reaction with Pd during the preparation of the catalyst of Embodiment 1. In the results obtained after the aging at 900° C., the HC adsorption rate is only slightly lowered from that obtained at the fresh time in Embodiment 1 but is largely lowered in the comparative example. This suggests that the Ag is more largely distributed in the HC adsorbent layer in Embodiment 1 than in the comparative example or that a smaller amount of Ag has been moved from the HC adsorbent layer to the Pd catalyst layer in Embodiment 1 than in the comparative example.

Figure 5:
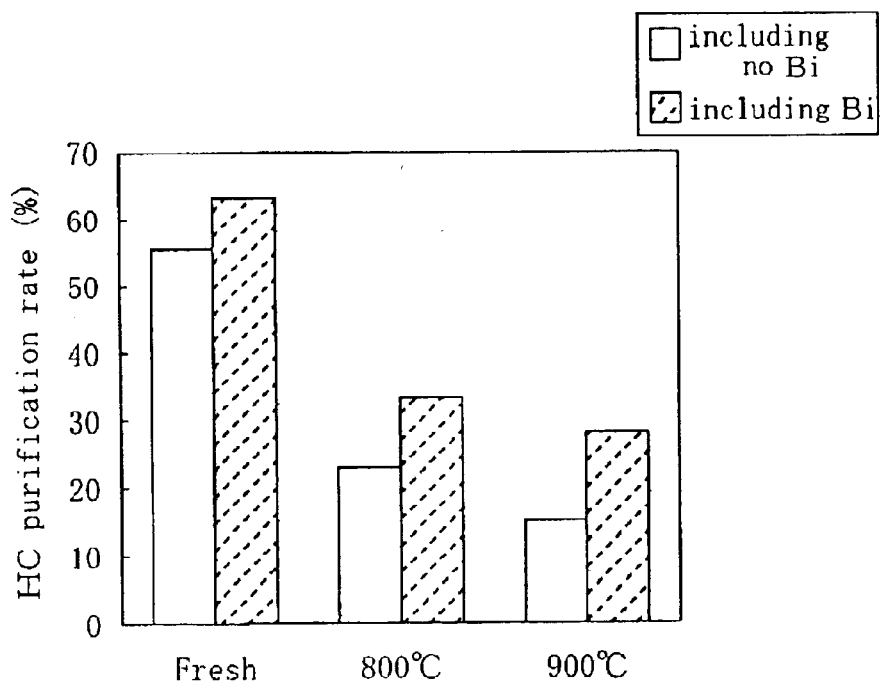
FIG. 5 is a graph for comparing the catalysts of Embodiment 1 and the comparative example in HC purifying performance.

According to FIG. 5, the HC purification rate obtained at the fresh time is higher in the catalyst of Embodiment 1 including Bi than in the catalyst of the comparative example including no Bi. This suggests that the HC discharging temperature of the HC adsorbent is higher or that the low temperature activity of Pd is less degraded (namely, the active temperature region is less shifted toward a high temperature) in Embodiment 1 than in the comparative example, namely, smaller amounts of Pd and Ag have been changed into an alloy during the preparation of the catalyst of Embodiment 1. In the results obtained after the aging at 800° C. and 900° C., the HC purification rate is less lowered from that obtained at the fresh time in Embodiment 1 than in the comparative example. This suggests that smaller amounts of Pd and Ag have been changed into an alloy through the aging in Embodiment 1 than in the comparative example.

Therefore, the influence of the presence of the Bi on the Ag and the Pd included in the catalyst and the influence of the presence of an element other than Bi on the Ag and the Pd included in the catalyst are examined by using model catalysts prepared as follows:

Model catalyst (including Bi) (according to embodiment)

This model catalyst includes merely one catalyst layer formed on a honeycomb carrier. The catalyst layer includes a catalyst in which Pd, Ag and Bi are carried on alumina, and a binder. The model catalyst is prepared as follows:

Palladium nitrate, silver nitrate and bismuth nitrate are dissolved in an ion-exchanged water. An active alumina powder is impregnated with the obtained mixed solution and the resultant is baked at 500° C. for 2 hours. The thus obtained catalyst powder is mixed with a binder to give a slurry. The resultant is applied on a honeycomb carrier made from cordierite by the wash coat method and dried at 200° C., and these procedures are repeated until a desired amount of catalyst powder is supported on the carrier. Thereafter, the resultant carrier is baked at 500° C. for 2 hours. The supported amount of the Pd is 4.5 g/L, the supported amount of the Ag is 10 g/L and the supported amount of the Bi is 10 g/L.

Model catalyst (including no additional element) (Comparative example)

A model catalyst including no additional element is prepared in the same manner as the model catalyst (including Bi) except that the supported amount of the Bi is zero.

Model catalyst (including Cs) (Comparative example)

A model catalyst including Cs is prepared in the same manner as the model catalyst (including Bi) except that Cs is used instead of Bi.

Model catalyst (including Sr) (Comparative example)

A model catalyst including Sr is prepared in the same manner as the model catalyst (including Bi) except that Sr is used instead of Bi.

Each of these model catalysts is examined for the X-ray diffraction pattern through XRD (X-ray diffraction analysis) of the catalyst layer performed after hydrothermal aging. In the hydrothermal aging, each catalyst is exposed to a gas including 10% of moisture vapor (with the remaining of $N_2$) at 800° C. for 24 hours. The results are shown in FIG. 6.

Figure 6:
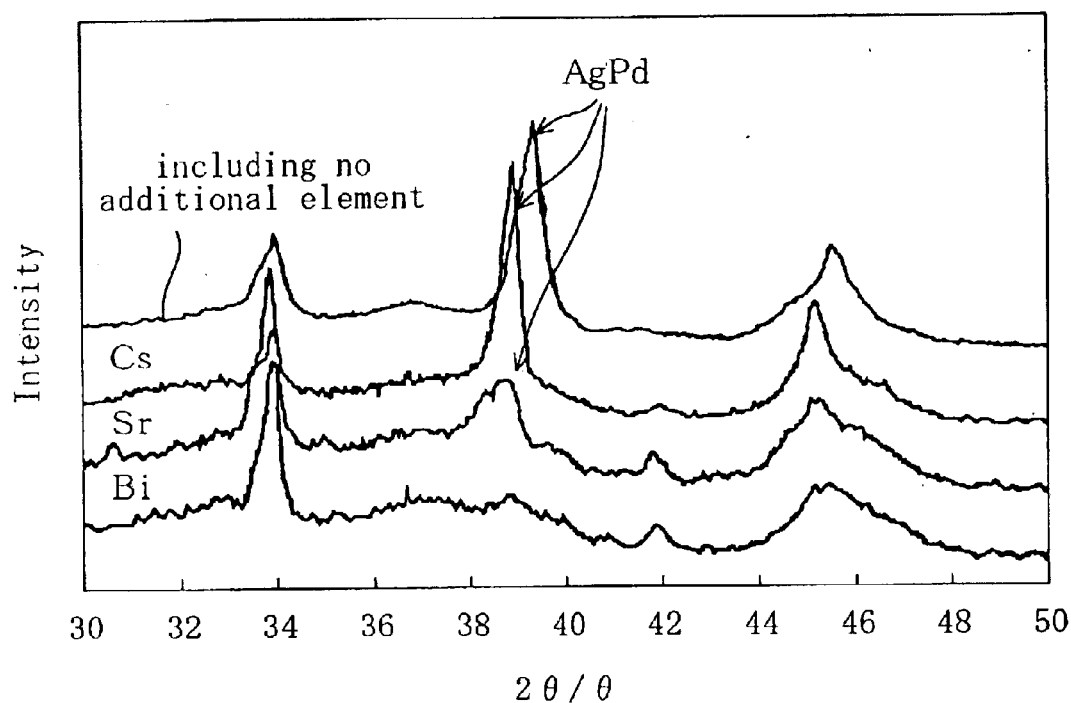
FIG. 6 is an X-ray diffraction pattern diagram for showing influence, on production of a Ag—Pd alloy, of the presence and the kind of an additional element.

According to FIG. 6, a Ag—Pd alloy is produced in all the model catalysts of the comparative examples but is minimally produced in the model catalyst (including Bi) according to the embodiment. Furthermore, catalysts respectively including Ca, Ba and Mg instead of Bi are prepared in the same manner and examined for the X-ray diffraction patterns after the hydrothermal aging. Also in these catalysts, the obtained patterns are similar to those of the catalyst including Cs or Sr and a Ag—Pd alloy is produced.

Figure 7:
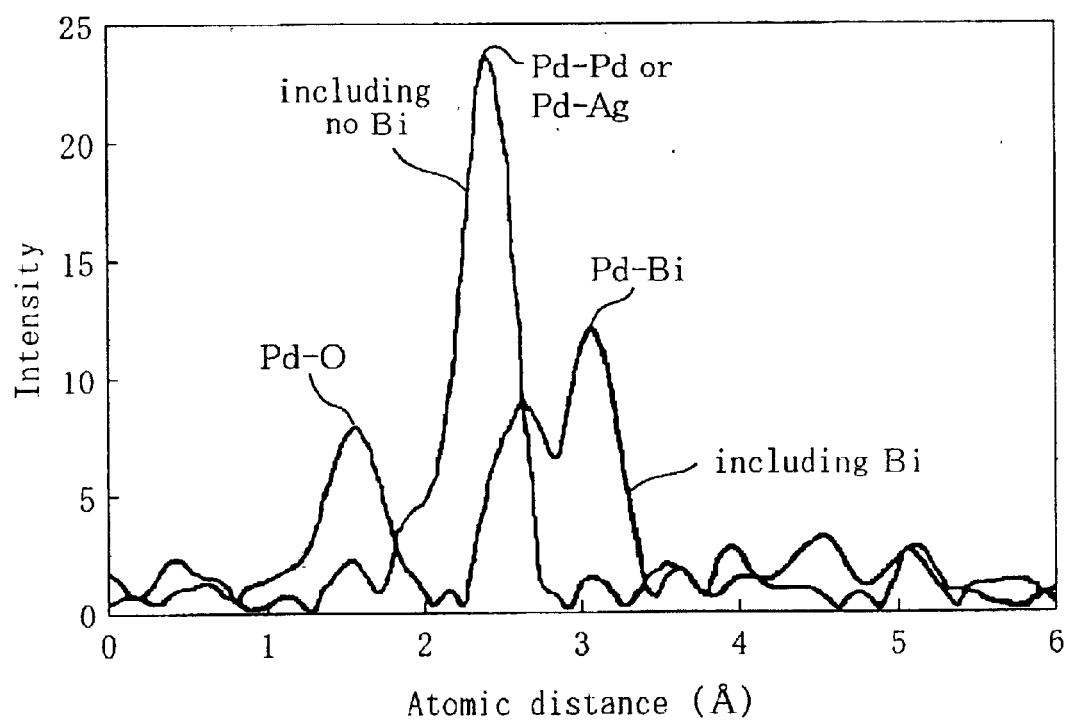
FIG. 7 is a graph for showing influence of the presence of Bi on the existing state of atoms in the vicinity of a Pd atom.

Therefore, in the model catalyst (including Bi) of the embodiment and the model catalyst (including no additional element) of the comparative example, the existing state of atoms in the vicinity of a Pd atom after the hydrothermal aging is examined. The results are shown in FIG. 7, in which the result obtained in the catalyst of the embodiment is indicated by using a line with "including Bi" and that of the comparative example is indicated by using a line with "including no Bi". In the catalyst including no Bi, most of the nearest neighbor atoms of a Pd atom are Pd or Ag, but in the catalyst including Bi, a comparatively large number of oxygen and Bi atoms are present as the nearest neighbor atoms of a Pd atom.

On the basis of the results shown in FIGS. 6 and 7, it is understood that when Bi is included as in the catalyst of Embodiment 1, the Bi is the nearest neighbor atom of Pd, which prevents the reaction (for producing an alloy) between Pd and Ag. Therefore, the HC purifying performance is higher in Embodiment 1 than in the comparative example (as shown in FIG. 5).

Figure 8A:
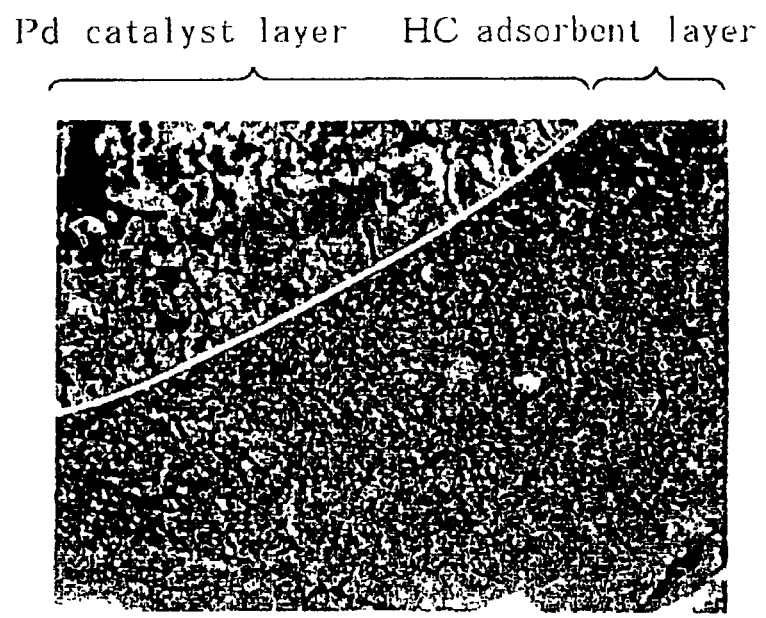
FIG. 8A is a photograph (secondary electron image), taken with a scanning electron microscope, of a HC adsorbent layer and a Pd catalyst layer of the catalyst of Embodiment 1
Figure 8B:
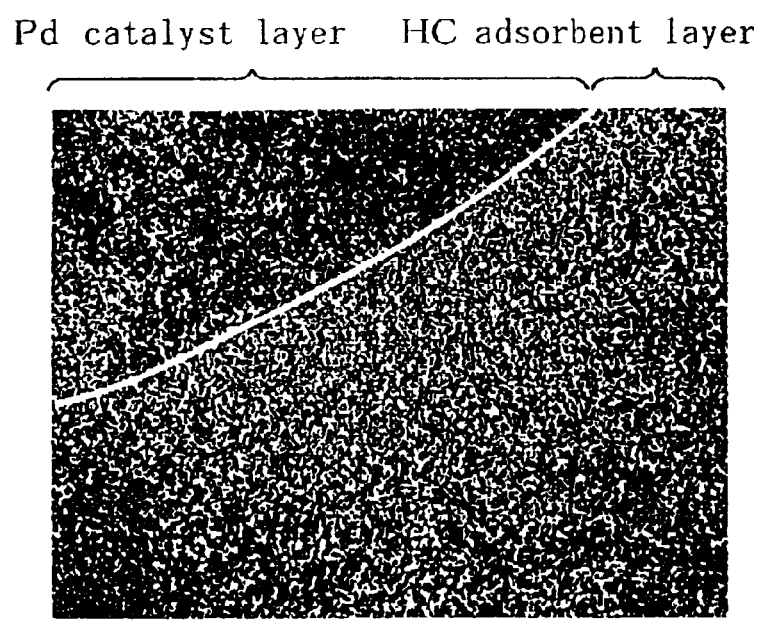
FIG. 8B is a characteristic X-rays photograph for showing Ag distribution in these two layers.
Figure 9A:
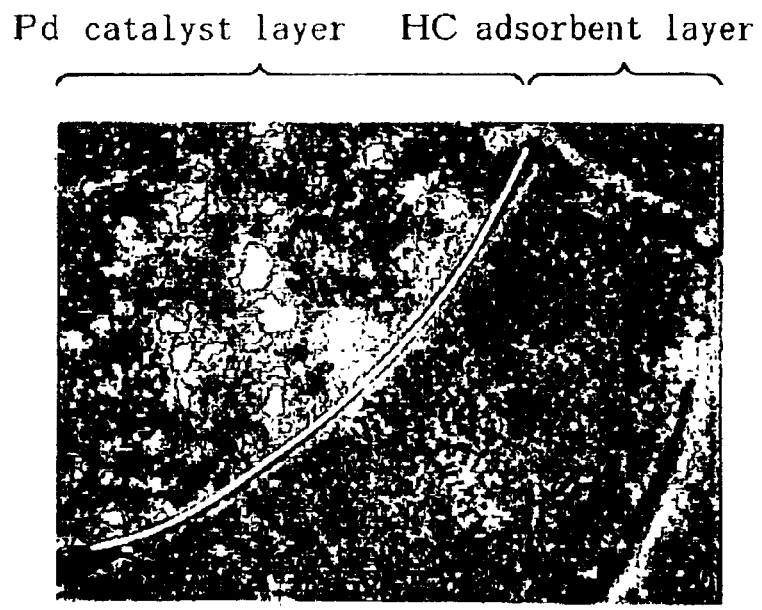
FIG. 9A is a photograph (secondary electron image), taken with a scanning electron microscope, of a HC adsorbent layer and a Pd catalyst layer of the catalyst of the comparative example
Figure 9B:
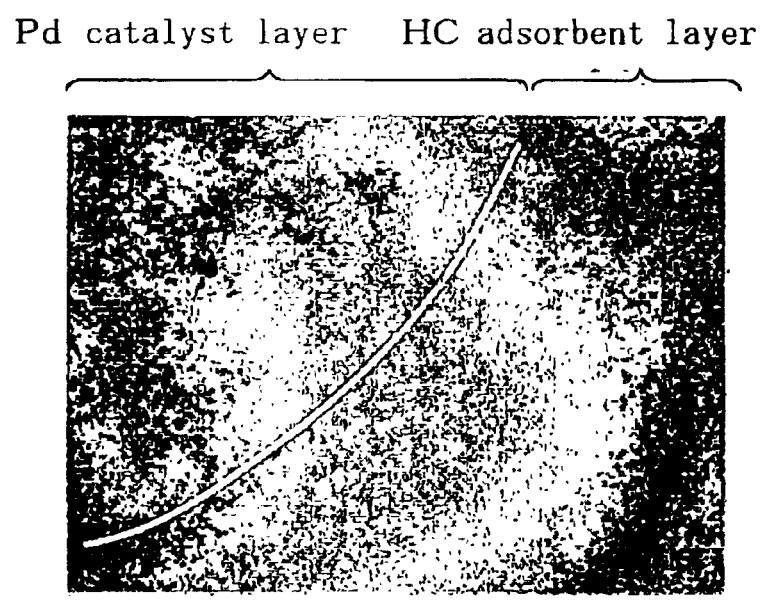
FIG. 9B is a characteristic X-rays photograph for showing Ag distribution in these two layers.

FIG. 8A is a photograph (secondary electron image) of the HC adsorbent layer and the Pd catalyst layer of the catalyst of Embodiment 1 taken with a scanning electron microscope after the hydrothermal aging, and FIG. 8B is a characteristic X-rays photograph for showing the distribution of Ag in these two layers. Also, FIG. 9A is a photograph (secondary electron image) of the HC adsorbent layer and the Pd catalyst layer of the catalyst of the comparative example taken with a scanning electron microscope after the hydrothermal aging, and FIG. 9B is a characteristic X-rays photograph for showing the distribution of Ag in these two layers. In FIGS. 8B and 9B, the Ag appears as a white dot or a white cloud (namely, a collection of white dots).

According to the photographs of FIGS. 8A through 9B, the Ag is more largely distributed in the HC adsorbent layer in Embodiment 1 than in the comparative example. This reveals that when Bi is included, not only the formation of a Ag—Pd alloy is suppressed but also Ag can be easily distributed in the HC adsorbent layer, and movement of the Ag from the HC adsorbent layer to the Pd catalyst layer may be possibly suppressed. Also, it is understood that since the Ag is thus largely distributed in the HC adsorbent layer, the HC adsorbing performance of Embodiment 1 is higher than that of the comparative example (as shown in FIG. 4).

Figure 10:
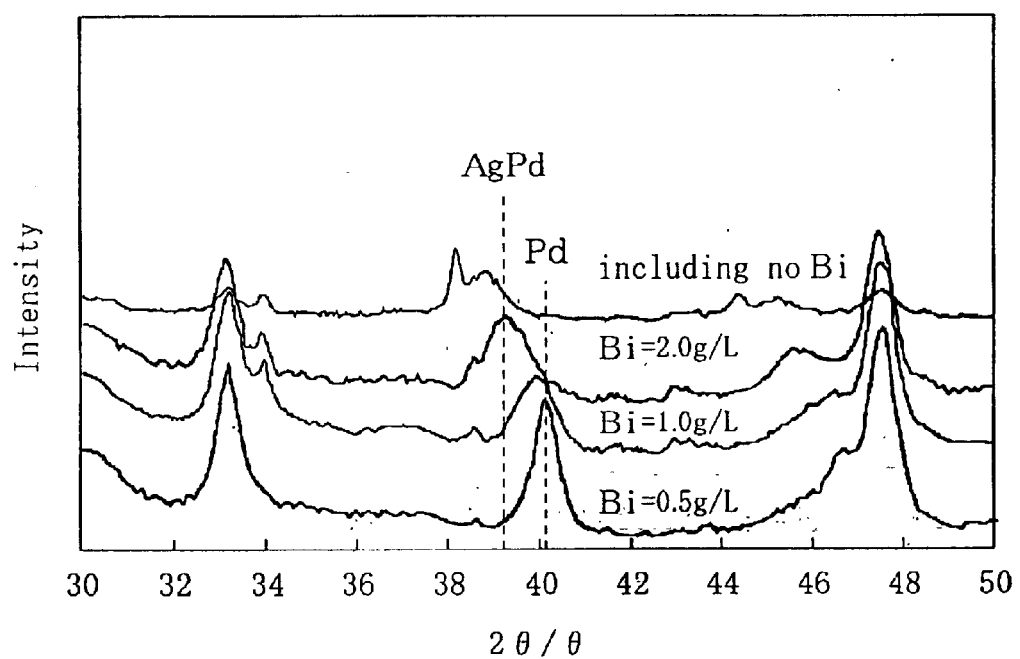
FIG. 10 is an X-ray diffraction pattern diagram for showing influence, on the production of an Ag—Pd alloy, of the supported amount of Bi in a model catalyst of the invention.

Next, four kinds of catalysts according to Embodiment 1, which respectively include Bi of 2.0 g/L, 1.0 g/L, 0.5 g/L and 0 g/L (namely, no Bi), are prepared and examined for the X-ray diffraction patterns after the hydrothermal aging. The results are shown in FIG. 10. In FIG. 10, the diffraction derived from a Ag—Pd alloy is found in the patterns of the catalyst "including no Bi" and the catalyst "including Bi=2.0 g/L", but the diffraction patterns of the catalyst "including Bi=1.0 g/L" and the catalyst "including Bi=0.5 g/L" are shifted at an angle of diffraction of Pd. This means that when the supported amount of the Bi is larger, the production of a Ag—Pd alloy is less effectively suppressed.

Next, these four kinds of catalysts of Embodiment 1 respectively including different amounts of Bi are evaluated for the purifying performance for HC, CO and NOx through a rig test.

In the rig test, each catalyst is installed on a fixed-bed flow reactor, 1) the inlet temperature of the catalyst is increased up to 80° C. in a flow of a nitrogen gas, 2) the temperature is kept at 80° C. for 2 minutes in a flow of simulated exhaust gas including 1500 ppmC of HC (benzene), 100 ppm of NO, 1.0% of oxygen and the remaining of nitrogen, and thereafter, 3) the inlet temperature of the catalyst is increased from 80° C. to 400° C. at a rate of 30° C./min. in a flow of a gas obtained by cutting HC alone from the simulated exhaust gas.

Figure 11:
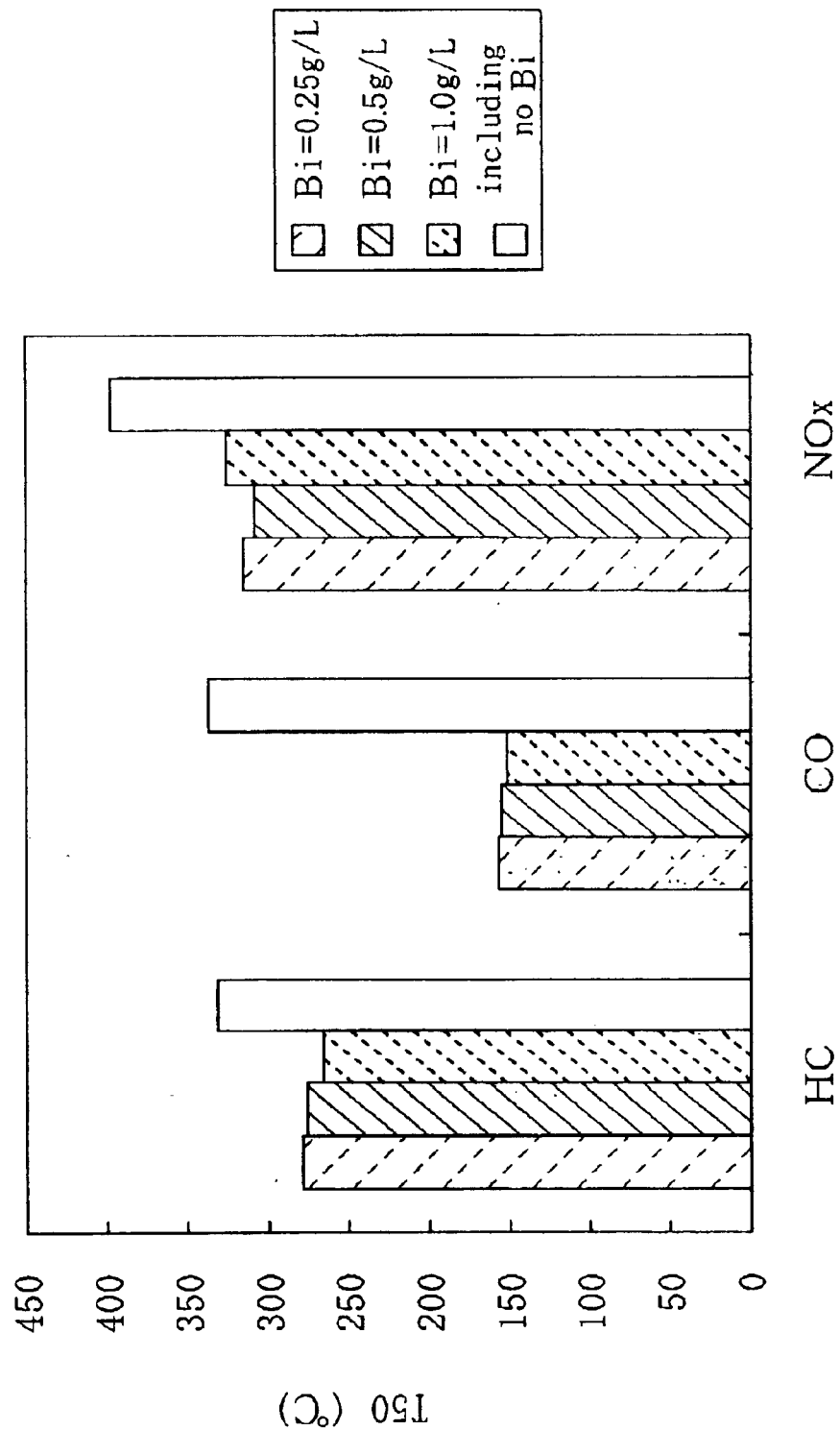
FIG. 11 is a graph for showing influence of the supported amount of Bi in the catalyst of Embodiment 1 on the light off temperature for purification of HC, CO and NOx.
Figure 12:
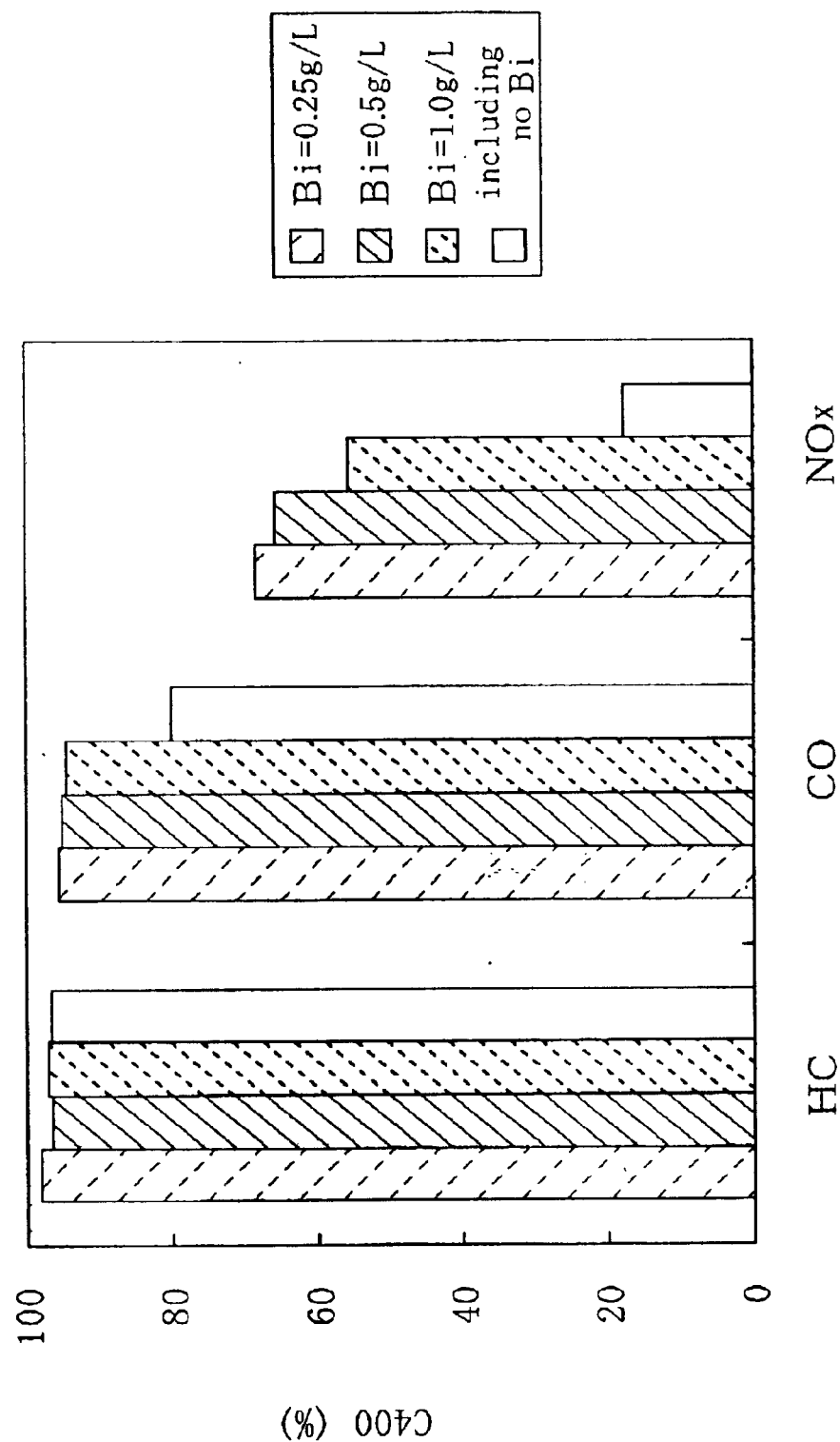
FIG. 12 is a graph for showing influence of the supported amount of Bi in the catalyst of Embodiment 1 on the purification rate of HC, CO and NOx at an inlet catalyst temperature of 400° C.

FIG. 11 shows the light off temperature T50 for purifying HC, CO and NOx (namely, the inlet temperature of the catalyst for attaining a purification rate half as high as the maximum purification rate). The light off temperature is lower in the catalyst including Bi than in the catalyst including no Bi. FIG. 12 shows the purification rates for HC, CO and NOx at 400° C. The purification rate is higher in the catalyst including Bi than in the catalyst including no Bi. In particular, the effect of Bi clearly appears in the CO and NOx purification rates. It is found, on the basis of these results, that the activity degradation of Pd (namely, the production of a Ag—Pd alloy) can be suppressed by including Bi and that the suitable supported amount of the Bi is 0.25 through 1.0 g/L.

Embodiment 2

A catalyst with the three-layer structure shown in FIG. 3 is used in this embodiment. The carrier 10 used in this embodiment is a honeycomb carrier made from cordierite and having 400 cells in a cross-section of approximately 6.45 $cm^2$ (namely, 1 $inch^2$), a wall thickness between adjacent cells of approximately 0.15 mm (6 milli-inch) and a volume of 1.3 L.

The HC adsorbent layer 11 used in this embodiment is formed by impregnating, with a solution of Ag and Bi, a mixture layer of β-type zeolite and a hydrated alumina binder with a boehmite structure, so as to carry Ag and Bi. The supported amount of the β-type zeolite is 160 g/L, and the supported amount of the hydrated alumina binder is 20 mass % of that of the β-type zeolite. The β-type zeolite has a $SiO_2/Al_2O_3$ ratio of 300.

The Pd catalyst layer 12 used in this embodiment is formed by impregnating, with a solution of Ag and Bi, a mixture layer of a catalyst powder in which Pd is carried on a supporting member (that is, a mixture of active alumina (γ-alumina) and a Ce—Pr double oxide) and a zirconia binder, so as to carry Ag and Bi. The supported amount of the active alumina is 33 g/L, the supported amount of the Ce—Pr double oxide is 11 g/L, the supported amount of the zirconia binder is 7.5 g/L, and the supported amount of the Pd is 2.7 g/L. The used zirconia binder is zirconyl acetate, which may be replaced with zirconium hydroxide or zirconium acetate.

The ternary catalyst layer 13 used in this embodiment is formed by impregnating, with a solution of Ag and Bi, a mixture layer of a catalyst powder in which Pt is carried on active alumina serving as a supporting member, a catalyst powder in which Rh is carried on a Ce—Nb—Zr double oxide serving as an oxygen occlusion agent, and a hydrated alumina binder, so as to carry Ag and Bi. The supported amount of the active alumina is 37 g/L, the supported amount of the Ce—Nb—Zr double oxide is 12 g/L, the supported amount of the binder is 11 g/L, the supported amount of the Pt is 0.1 g/L and the supported amount of the Rh is 0.2 g/L.

The total supported amount of the Ag in the layers 11 through 13 is 10 g/L, and the total supported amount of the Bi is 0.5 g/L.

This HC adsorbing catalyst is prepared as follows:

(Formation of insider layer, namely, HC adsorbent layer)

The inside layer (the HC adsorbent layer) is formed in the same manner as in Embodiment 1.

(Formation of intermediate layer, namely, ternary catalyst layer)

A solution of dinitrodiamine platinum nitrate dissolved in an ion-exchanged water is added dropwise to an active alumina powder, and the resultant is dried and baked at 500° C. to give a Pt carrying catalyst powder. A solution of rhodium nitrate dissolved in an ion-exchanged water is added dropwise to a Ce—Nb—Zr double oxide powder, and the resultant is dried and baked at 500° C. to give a Rh carrying catalyst powder. The Pt carrying catalyst powder, the Rh carrying catalyst powder and an alumina binder are mixed. Water and nitric acid are added to the resultant mixture and the resultant is mixed and stirred with a disperser to give a slurry in the same manner as in the formation of the HC adsorbent layer. The slurry is coated over the HC adsorbent layer on the honeycomb carrier in the above described manner, and the resultant is baked at 500° C. for 2 hours.

(Formation of outside layer, namely, Pd catalyst layer)

The outside layer (the Pd catalyst layer) is formed in the same manner as in Embodiment 1.

(Impregnation with Ag solution and Bi solution)

Ag and Bi are allowed to be carried on the coating layers (namely, the inside layer, the intermediate layer and the outside layer) of the honeycomb carrier through the impregnation in the same manner as in Embodiment 1.

Evaluation test for HC adsorbing and HC purifying performances

The catalyst of Embodiment 2 and the catalyst having the two-layer structure of the comparative example (described in Embodiment 1) are loaded on actual cars for the evaluation test. In this test, the HC adsorbing performance and HC purifying performance are examined after bench aging at an appropriate temperature ranging between 600° C. and 900° C. for 24 hours. The test results of the HC adsorbing performance are shown in FIG. 13, and the test results of the HC purifying performance are shown in FIG. 14.

Figure 13:
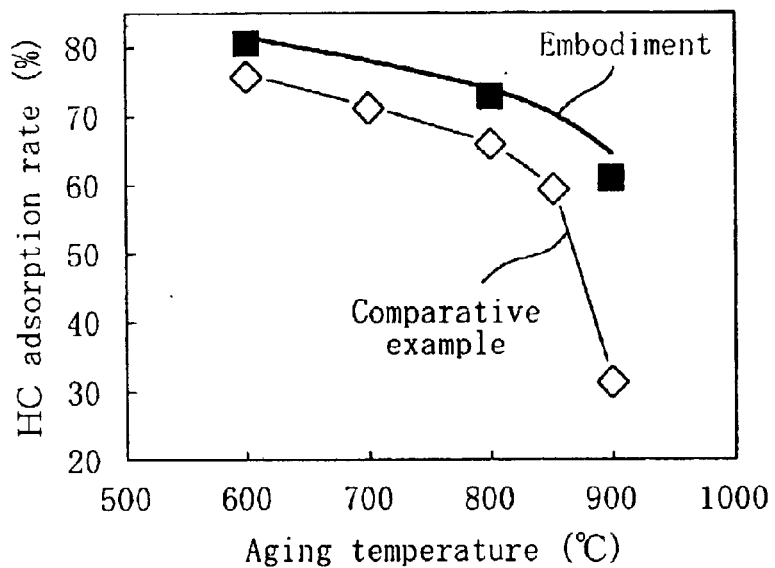
FIG. 13 is a graph for comparing catalysts of Embodiment 2 of the invention and the comparative example in the HC adsorbing performance.
Figure 14:
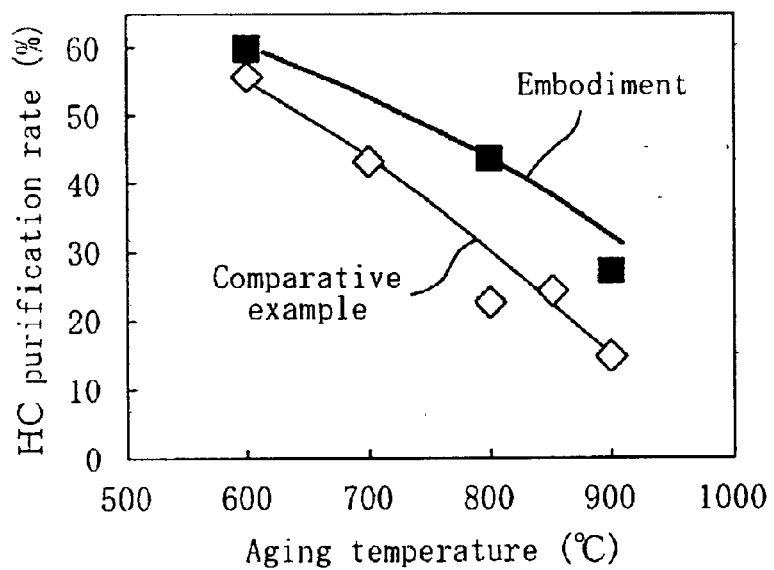
FIG. 14 is a graph for comparing the catalysts of Embodiment 2 and the comparative example in the HC purifying performance.

According to FIGS. 13 and 14, the catalyst having the three-layer structure also has high HC adsorbing performance and HC purifying performance equivalent to those of the catalyst having the two-layer structure of Embodiment 1. In particular, the HC adsorption rate obtained after the aging at 900° C. is remarkably higher in Embodiment 2 than in the comparative example. Also, the HC purification rate of the catalyst of Embodiment 2 obtained after the aging at 800° C. is approximately twice as high as that of the comparative example. Furthermore, the HC purification rate obtained after the aging at 800° C. is higher in Embodiment 2 (shown in FIG. 14) than in Embodiment 1 (shown in FIG. 5).

Figure 15:
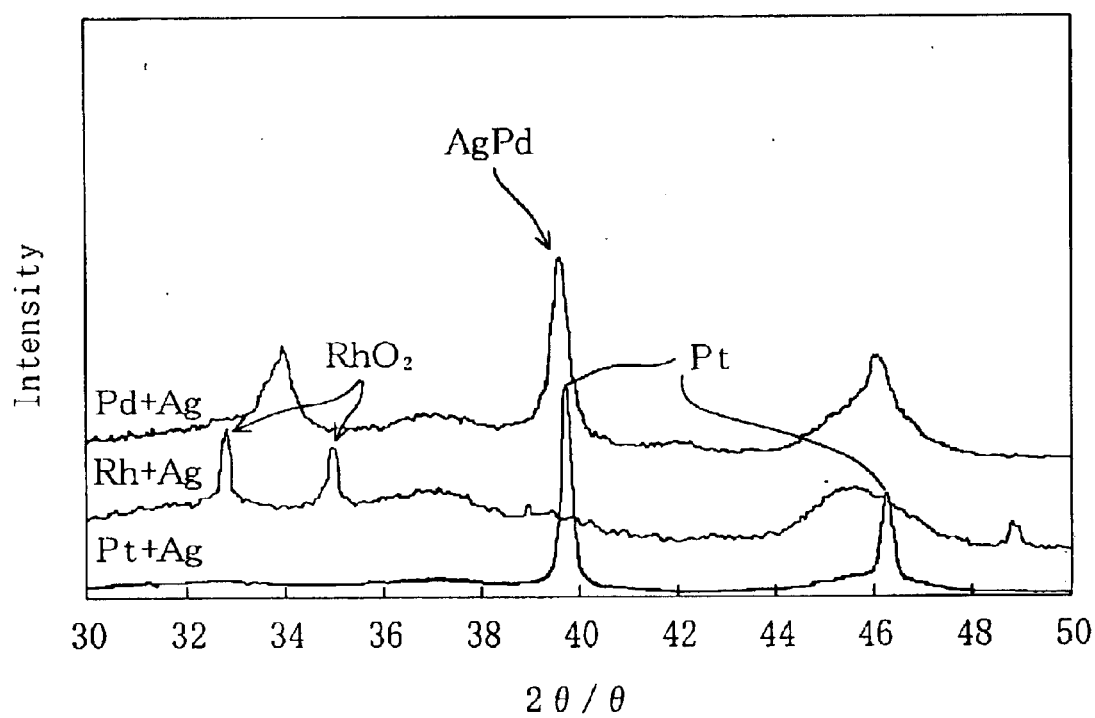
FIG. 15 is an X-ray diffraction pattern diagram for showing reactivity between a noble metal and Ag in a model catalyst.

FIG. 15 shows X-ray diffraction patterns resulting from examination of reactivity between a noble metal, such as Pd, Rh or Pt, and Ag. In FIG. 15, "Pd+Ag" means the above-described model catalyst (including no additional element) in which Pd and Ag are carried on active alumina, "Rh+Ag" means a catalyst prepared in the same manner as the model catalyst (including no additional element) except Rh used instead of Pd, and "Pt+Ag" means a catalyst prepared in the same manner as the model catalyst (including no additional element) except Pt used instead of Pd. In each catalyst, the supported amount of the noble metal is 4.5 g/L and the supported amount of the Ag is 10 g/L.

According to FIG. 15, it is found that Pt and Rh have low reactivity with Ag. Accordingly, in the three-layer structure as in that of Embodiment 2 having, as the intermediate layer, a ternary catalyst layer including Pt and Rh but not including Pd, it seems that movement of the Ag from the HC adsorbent layer to the Pd catalyst layer can be easily prevented by the intermediate ternary catalyst layer.

Figure 16:
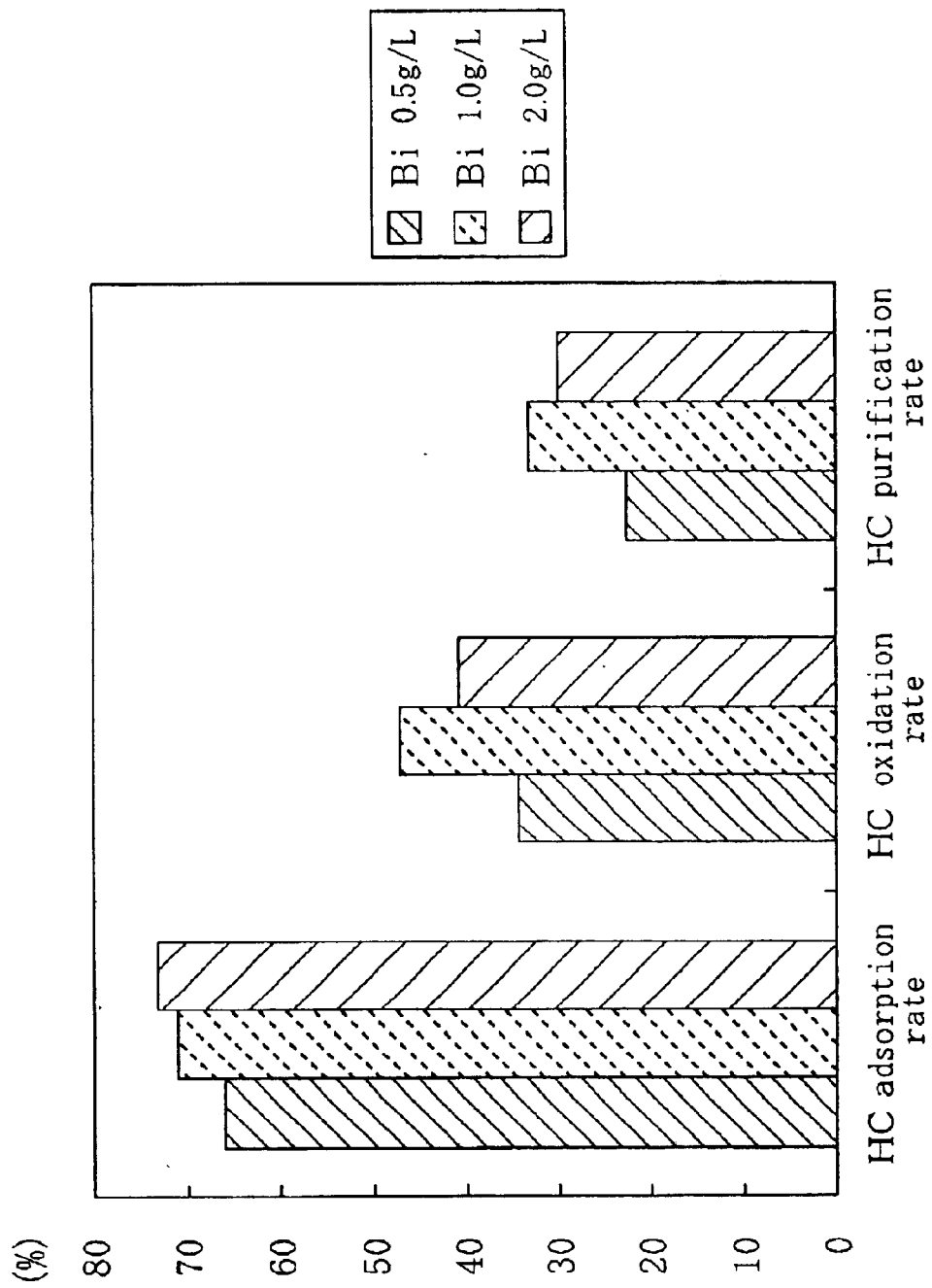
FIG. 16 is a graph for showing influence of the supported amount of Bi in the catalyst of Embodiment 1 on a HC adsorption rate, a HC oxidation rate and a HC purification rate.

FIG. 16 shows the HC adsorption rate, the HC oxidation rate (namely, a rate of oxidized HC in adsorbed HC) and the HC purification rate (namely, the HC adsorption rate×the HC oxidation rate), obtained through the evaluation using an actual car, of catalysts having the three-layer structure of Embodiment 2 respectively including Bi of 0.5 g/L, 1.0 g/L and 2.0 g/L. According to FIG. 16, the HC adsorption rate is higher as the supported amount of the Bi is larger. However, when the supported amount of the Bi exceeds 2.0 g/L, the HC oxidation rate is lower than that obtained when the supported amount of the Bi is 1.0 g/L and the HC purification rate is similarly lowered. This reveals that a too large supported amount of the Bi is disadvantageous for the performances of the catalyst.

What is claimed is:

1. An oxidation catalyst comprising:

Pd, Ag, and Bi all being carried on alumina, wherein said Bi is present as the nearest neighbor atom of said Pd.

2. An exhaust gas purifying catalyst for purifying exhaust gas from an engine, comprising:

a carrier;

a HC adsorbent layer including a HC adsorbent for adsorbing HC in said exhaust gas and discharging adsorbed HC, and Ag; and an oxidation catalyst layer including Pd and Bi for oxidizing said HC discharged from said HC adsorbent, wherein said HC adsorbent layer and said oxidation catalyst layer are supported on said carrier with said HC adsorbent layer disposed inside and said oxidation catalyst layer disposed outside.

3. The exhaust gas purifying catalyst of claim 2, further comprising, between said HC adsorbent layer and said oxidation catalyst layer, an intermediate layer including no Pd and allowing HC to move between said HC adsorbent layer and said oxidation catalyst layer.

4. The exhaust gas purifying catalyst of claim 2, wherein said HC adsorbent layer disposed inside and said oxidation catalyst layer disposed outside are supported on said carrier by forming, on said carrier, an inside layer including said HC adsorbent and no Ag and an outside layer including Pd, baking said inside layer and said outside layer, and simultaneously allowing Ag and Bi to be carried on said inside layer and said outside layer through impregnation, and said HC adsorbent is zeolite.

5. A method for preparing a catalyst in which Pd, Ag and Bi are carried on a supporting member, comprising the steps of:

allowing said Pd to be carried on said supporting member; and allowing said Ag and said Bi to be carried on said supporting member without allowing said Ag to be carried priorly to said Bi.

* * * * *